United States Patent
Cho et al.

(10) Patent No.: US 9,860,458 B2
(45) Date of Patent: Jan. 2, 2018

(54) METHOD, APPARATUS, AND SYSTEM FOR SWITCHING TRANSPORT STREAM

(71) Applicant: ELECTRONICS AND TELECOMMUNICATIONS RESEARCH INSTITUTE, Daejeon-si (KR)

(72) Inventors: Suk Hee Cho, Daejeon (KR); Jong Ho Kim, Daejeon (KR); Hyon Gon Choo, Daejeon (KR); Jin Soo Choi, Daejeon (KR); Jin Woong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 464 days.

(21) Appl. No.: 14/305,610

(22) Filed: Jun. 16, 2014

(65) Prior Publication Data

US 2014/0375889 A1    Dec. 25, 2014

(30) Foreign Application Priority Data

Jun. 19, 2013   (KR) .................. 10-2013-0070093
Jun. 3, 2014    (KR) .................. 10-2014-0067662

(51) Int. Cl.
| | | |
|---|---|---|
| H04N 5/268 | (2006.01) | |
| H04N 5/44 | (2011.01) | |
| H04N 21/234 | (2011.01) | |
| H04N 21/2365 | (2011.01) | |
| H04N 21/81 | (2011.01) | |
| H04N 13/00 | (2006.01) | |

(52) U.S. Cl.
CPC ......... *H04N 5/268* (2013.01); *H04N 13/0055* (2013.01); *H04N 13/0059* (2013.01); *H04N 21/2365* (2013.01); *H04N 21/23424* (2013.01); *H04N 21/812* (2013.01); *H04N 21/8106* (2013.01)

(58) Field of Classification Search
CPC ........... H04N 13/0055; H04N 13/0059; H04N 21/23424; H04N 21/2365; H04N 21/8106; H04N 21/812; H04N 5/268
USPC .................................................... 375/240.26
See application file for complete search history.

(56) References Cited

U.S. PATENT DOCUMENTS

| | | | | |
|---|---|---|---|---|
| 6,611,624 B1 * | 8/2003 | Zhang | ............. | H04N 21/23406 370/498 |
| 6,785,289 B1 * | 8/2004 | Ward | ............... | H04J 3/22 370/412 |

(Continued)

FOREIGN PATENT DOCUMENTS

| | | |
|---|---|---|
| JP | 2008-154018 A | 7/2008 |
| KR | 10-0211977 B1 | 8/1999 |

*Primary Examiner* — Francis G Geroleo
(74) *Attorney, Agent, or Firm* — NSIP Law

(57) ABSTRACT

A method of switching a transport stream, (TS) such as an MPEG-2 TS, receives a plurality of input streams, receives a switching command for a first input stream, among the plurality of input streams, that is currently being output, searches for an out-point of the first input stream and an in-point of a second input stream to be newly output, in response to the switching command, inserts a virtual P picture stream between the out-point and the in-point, and switches from the first input stream into the second input stream based on the out-point and the in-point.

18 Claims, 17 Drawing Sheets

(56) References Cited

U.S. PATENT DOCUMENTS

| | | | | |
|---|---|---|---|---|
| 6,823,010 B1* | 11/2004 | Curet | ............... | H04N 21/44016 |
| | | | | 348/512 |
| 6,993,081 B1 | 1/2006 | Brunheroto et al. | | |
| 8,571,111 B2* | 10/2013 | Levy | ................... | H04N 5/4401 |
| | | | | 375/240.25 |
| 8,687,656 B2* | 4/2014 | Zhang | ............... | H04L 29/06027 |
| | | | | 370/486 |
| 8,743,958 B2* | 6/2014 | Thoreau | ........... | H04N 21/23424 |
| | | | | 375/240.01 |
| 8,755,669 B2* | 6/2014 | Sundy | .............. | H04N 21/23424 |
| | | | | 386/235 |
| 2002/0087976 A1* | 7/2002 | Kaplan | .............. | H04N 7/17336 |
| | | | | 725/34 |
| 2003/0206596 A1* | 11/2003 | Carver | ............. | H04N 21/44016 |
| | | | | 375/240.26 |
| 2007/0234395 A1* | 10/2007 | Dureau | ................ | H04N 5/4401 |
| | | | | 725/135 |
| 2012/0307843 A1* | 12/2012 | Zhang | .............. | H04L 29/06027 |
| | | | | 370/486 |

* cited by examiner

FIG. 2
(Prior Art)

| Program1 TS | Advertising1 TS | Program2 TS | Advertising2 TS |

FIG. 4A
(Prior Art)

| Single HDTV program | 3D TV program | Single HDTV program | 3D TV program |

FIG. 4B
(Prior Art)

| Single HDTV program | MMS program | Single HDTV program | MMS program |

METHOD, APPARATUS, AND SYSTEM FOR SWITCHING TRANSPORT STREAM

Priorities to Korean patent application number 10-2013-0070093 filed on Jun. 19, 2013 and Korean patent application number 10-2014-0067662 filed on Jun. 3, 2014, the entire disclosure of which is incorporated by reference herein, is claimed.

BACKGROUND OF THE INVENTION

Field of the Invention

The present invention relates to a method, apparatus, and system for switching a transport stream and, more particularly, to an MPEG-2 Transport Stream (TS) switching apparatus and method for switching and outputting a single MPEG-2 TS that belong to two or more MPEG-2 TSs output by different encoders and that is selected in response to a switching command from a user.

Discussion of the Related Art

FIG. 1 is a diagram illustrating an example of an in-point and out-point for the switching of an MPEG-2 TS.

Referring to FIG. 1, a conventional MPEG-2 TS switching method includes a TS switching method, that is, a method provided by ISO/IEC 1381-1 MPEG-2 systems. A "switching point of time" is divided into an "in-point" and an "out-point". The in-point is a point of time at which a new stream may be switched and entered, and the out-point is a point of time at which a stream may switch into an existing stream. In an existing TS switching method, for the seamless and continuous switching of an image as in FIG. 1, after a picture suitable for restriction conditions appears, switching is started using a corresponding point as a switching point of time. The picture suitable for the restriction conditions means that in the case of the out-point, the last picture needs to be an I or P picture on the basis of a Presentation Time Stamp (PTS) and the start of a video stream of a newly replaced stream (e.g., a B stream in FIG. 1) needs to be an I picture. Furthermore, a B picture (i.e., a B picture indicated by dotted lines in the B stream) behind the I picture of the in-point needs to be encoded so that it does not refer video before the in-point. If not, there is a problem in that a decoder may not properly restore the B picture because information about an image referred by the B picture indicated by the dotted lines is unable to be obtained.

FIG. 2 is a diagram illustrating an example in which a plurality of MPEG-2 TSs is connected.

Referring to FIG. 2, in the MPEG-2 TS switching methods provided by ISO/IEC 1381-1 MPEG-2 systems, MPEG-2 TSs corresponding to respective programs have already been produced as shown in FIG. 2, and the TSs of the programs are sequentially connected. Accordingly, as shown in FIG. 2, the first of an advertisement 1 TS that will be switched after a program 1 TS may have been encoded into an Instantaneous Decoding Refresh (IDR) picture. Accordingly, there is no problem because an in-point will become the IDR picture and the B picture indicated by the dotted lines in the B stream of FIG. 1 is not present.

In the case where a plurality of MPEG-2 TSs continues to be received from different encoders, however, there is a problem in that a delay time is too long if switching is performed after an IDR picture is reached at a stream to be switched and entered.

Furthermore, a closed GOP structure may be used to obviate a problem in that a B picture subsequent to the I picture of a stream to be switched and entered cannot be decoded. In general, in broadcasting, the video of a broadcasting program is encoded in an open GOP structure by taking an encoding efficiency viewpoint into consideration. It is however almost impossible to perform encoding in the closed GOP structure only at a point where a stream is expected to be replaced because the setting of an encoder needs to be changed.

Furthermore, two MPEG-2 TSs need to be switched within a short time as much as possible without buffering a plurality of received MPEG-2 TSs. To this end, the I picture of a B stream needs to be input at a point of time at which a P or I picture is started on the basis of a Decoding Time Stamp (DTS) in a stream A.

FIG. 3 is a diagram illustrating an example of an in-point having great delay in the switching of an MPEG-2 TS.

From FIG. 3, it may be seen that after an out-point is searched for, it is difficult to disconnect a stream A because an I picture that first appears in a B stream is input to a P picture of the stream A, and as a result, switching is performed at the moment when the I picture of the B stream is input at the same time as the P or I picture of the stream A is ended. Accordingly, there is a problem in that switching delay time becomes significantly long.

FIG. 4A illustrates an example of the conventional mixed broadcasting of HDTV service and 3DTV service, and FIG. 4B illustrates an example of the conventional mixed broadcasting of HDTV service and multi-channel service.

Referring to FIGS. 4A and 4B, if an HDTV program, a 3D program, and a multi-channel service program are interchangeable with one another and served in a single channel, a problem may occur when MPEG-2 TSs are switched.

Accordingly, there is a need to connect two MPEG-2 TSs to two different MPEG-2 TSs in such a manner that the two MPEG-2 TSs may be restored without a phenomenon in which audio or video is disconnected or broken at a point of time at which the two MPEG-2 TSs are connected to the two different MPEG-2 TSs.

SUMMARY OF THE INVENTION

An embodiment of the present invention relates to a method of connecting two MPEG-2 TSs output by different encoders, and an object of the present invention is to provide a method and apparatus for connecting different MPEG-2 TSs in such a manner that the different MPEG-2 TSs can be restored without a phenomenon in which audio or video is disconnected or broken at a point of time at which the different MPEG-2 TSs are connected.

In accordance with an aspect of the present invention, there is provided a method of switching a transport stream, including receiving a plurality of different input streams, receiving a switching command for a first input stream that belongs to the plurality of input streams and that is now output, searching for the out-point of the first input stream and the in-point of a second input stream that is newly output, based on the switching command, inserting a virtual P picture stream between the out-point and the in-point, and performing switching from the first input stream into the second input stream based on the out-point and the in-point.

The out-point may be searched for as the start point of the first I or P picture of the first input stream after the switching command, and the in-point may be searched for as the start point of the first I picture of the second input stream after the out-point.

The virtual P picture stream may be inserted by replacing a picture stream of the first input stream from the out-point to the in-point, and a null packet corresponding to the length of the picture stream from the out-point to the in-point may be filled.

The virtual P picture stream may include a stream in which the motion information of all the macro blocks and a residual signal are made 0 according to an encoding method through the analysis of a video Element Stream (ES) included in the first or the second input stream.

If the P or B picture of the second input stream after the in-point that refers to a picture before the in-point is present, the P or B picture may be replaced with the virtual P picture stream, and a null packet corresponding to the length of a packet may be inserted.

The Presentation Time Stamp (PTS), Decoding Time Stamp (DTS), and time stamp of a Program Clock Reference (PCR) of the second input stream after the in-point may be modified so that the PTS, the DTS, and the time stamp become a PTS, a DTS, and a time stamp of a PCR that are continuous based on the time information of the first input stream.

If the second input stream is a stream of a 3D left image, in switching from the second input stream to a right-image video stream corresponding to the 3D left image, when the switching is performed based on the in-point of the second input stream, the PTS of a picture corresponding to the in-point of the second input stream may be stored, the PTS and DTS of the right-image video stream may be modified based on the stored PTS, and the PCR of the right-image video stream may be modified based on the PCR of the first input stream.

The method may further include counting a first frame count value that is the number of frames of the first input stream and a second frame count value that is the number of frames of the second input stream until a switching command for the second switching is input after the first switching when the second switching from the second input stream to the first input stream is performed after the first switching from the first input stream to the second input stream, comparing the first frame count value with the second frame count value, and performing the second switching based on a result of the comparison.

If, as a result of the comparison, the second frame count value is equal to or greater than the first frame count value, the null packet may be inserted between the out-point of the second input stream and the in-point of the first input stream by the length of a packet corresponding to the number of frames obtained by subtracting the second frame count value from the first frame count value when performing the second switching.

A picture stream up to the in-point of the first input stream after the inserted null packet may be replaced with the virtual P picture stream, and the length of the packet may be set using the null packet.

If, as a result of the comparison, the first frame count value is greater than the second frame count value, the virtual P picture stream may be inserted between the out-point of the second input stream and the in-point of the first input stream by the number of packets corresponding to the number of frames obtained by subtracting the first frame count value from the second frame count value when performing the second switching, the first frame count and the second frame count may continue to be performed while inserting and outputting the virtual P picture stream, and a virtual P picture stream may be additionally inserted until the first frame count becomes equal to the second frame count.

The switching of an audio signal from the first input stream to the second input stream may be performed by storing the PTS of a picture at which video is switched and using a point of time at which the PTS of subsequently input audio corresponds to a PTS at which a picture of the video is switched as a switching time point.

Different ring buffers for the first input stream and the second input stream may be configured, time information about each frame included in an audio Packetized Elementary Stream (PES) may be calculated based on time information included in the PES, and the calculated time information may be stored.

In accordance with an aspect of the present invention, there is provided an apparatus of switching a transport stream, including an input stream reception unit configured to receive a plurality of different input streams, a switching command input unit configured to receive a switching command for a first input stream that belongs to the plurality of input streams and that is now output, a search unit configured to search for the out-point of the first input stream and the in-point of a second input stream that is newly output, based on the switching command, an insertion unit configured to insert a virtual P picture stream between the out-point and the in-point, and a switching execution unit configured to perform switching from the first input stream into the second input stream based on the out-point and the in-point.

The insertion unit may be further configured to insert the virtual P picture stream by replacing a picture stream of the first input stream from the out-point to the in-point with the virtual P picture stream and fill a null packet corresponding to the length of the picture stream from the out-point to the in-point is filled.

The virtual P picture stream may include a stream in which motion information of all the macro blocks and a residual signal are made 0 according to an encoding method through an analysis of a video Element Stream (ES) included in the first or the second input stream.

The apparatus may further include a frame counter configured to count a first frame count value that is the number of frames of the first input stream and a second frame count value that is the number of frames of the second input stream until a switching command for second switching is input after first switching when the second switching from the second input stream to the first input stream is performed after the first switching from the first input stream to the second input stream, compare the first frame count value with the second frame count value, and perform the second switching based on a result of the comparison.

If, as a result of the comparison, the second frame count value is equal to or greater than the first frame count value, the null packet may be inserted between the out-point of the second input stream and the in-point of the first input stream by the length of a packet corresponding to the number of frames that is obtained by subtracting the second frame count value from the first frame count value when performing the second switching.

If, as a result of the comparison, the first frame count value is greater than the second frame count value, the virtual P picture stream may be inserted between the out-point of the second input stream and the in-point of the first input stream by the number of packets corresponding to the number of frames obtained by subtracting the first frame count value from the second frame count value when performing the second switching, the first frame count and the second frame count may continue to be performed while inserting and outputting the virtual P picture stream, and a virtual P picture stream may be additionally inserted until the first frame count becomes equal to the second frame count.

In accordance with an aspect of the present invention, there is a system for switching a transport stream, including a plurality of encoders configured to generate a plurality of encoded input streams and send the plurality of encoded input streams and a transport stream switching unit configured to receive the plurality of input streams from the plurality of encoders and perform switching into a specific input stream, The transport stream switching unit may receive a switching command for a first input stream that belongs to the plurality of input streams and that is now output, search for the out-point of the first input stream and the in-point of a second input stream that is newly output, in response to the switching command, insert a virtual P picture stream between the out-point of the first input stream and the in-point of the second input stream, and perform switching from the first input stream into the second input stream based on the out-point and the in-point.

BRIEF DESCRIPTION OF THE DRAWINGS

FIG. 2 is a diagram illustrating an example in which a plurality of MPEG-2 TSs is connected;

FIG. 4A illustrates an example of the conventional mixed broadcasting of HDTV service and 3DTV service;

FIG. 4B illustrates an example of the conventional mixed broadcasting of HDTV service and multi-channel service;

DETAILED DESCRIPTION OF THE EMBODIMENTS

Figure 1:
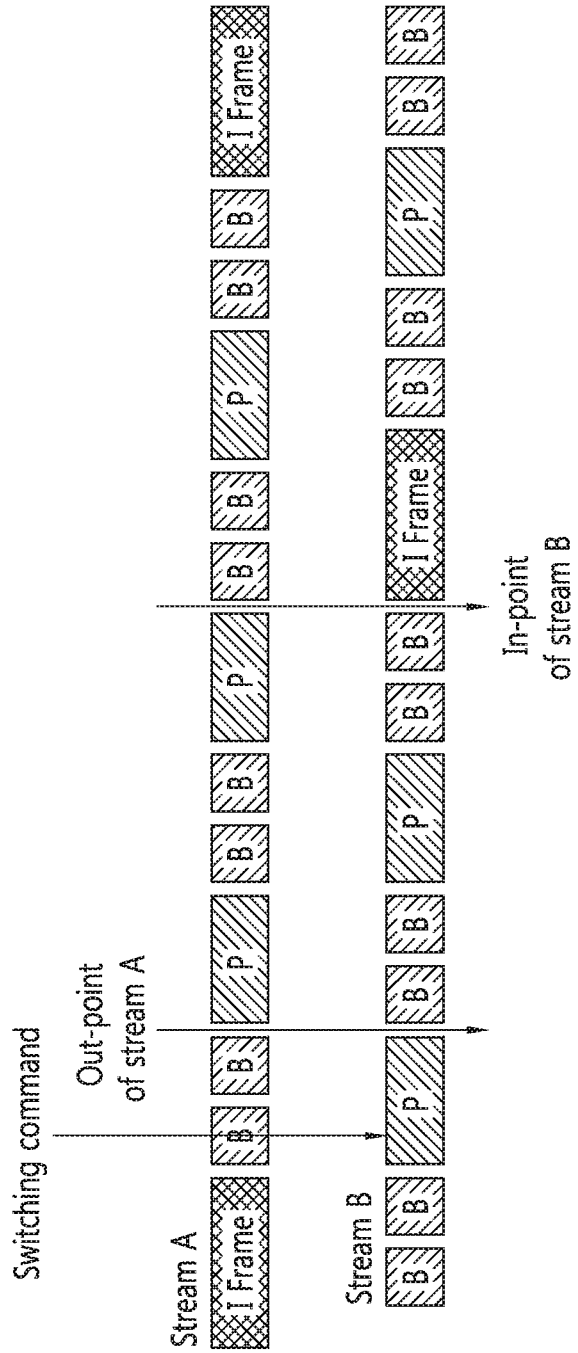
FIG. 1 is a diagram illustrating an example of an in-point and out-point for the switching of an MPEG-2 TS.
Figure 3:
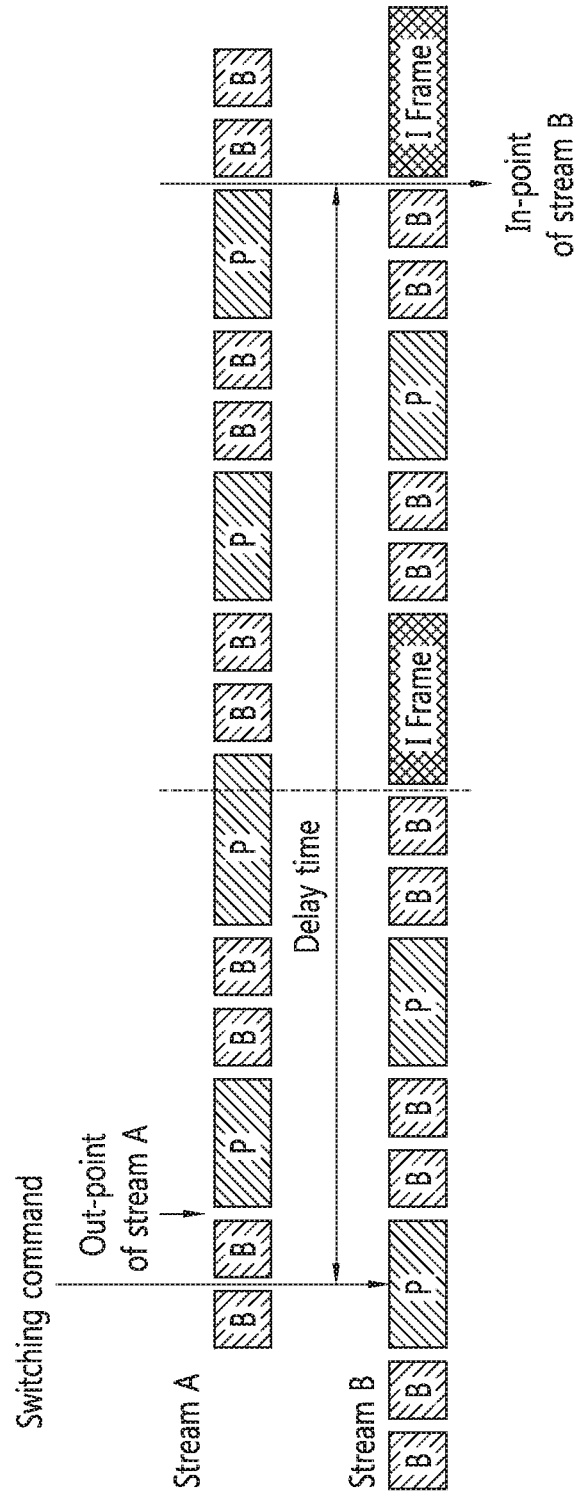
FIG. 3 is a diagram illustrating an example of an in-point having great delay in the switching of an MPEG-2 TS.

The present invention may be modified in various ways and may be implemented to have several embodiments. Specific embodiments are illustrated in the drawings and are described in detail.

It is however to be understood that the present invention is not intended to be limited to the specific embodiments, but that the specific embodiments include all modifications, equivalents, and substitutions which fall within the spirit and technical scope of the present invention.

Terms, such as the first and the second, may be used to describe various elements, but the elements should not be restricted by the terms. The terms are used to only distinguish one element and the other element from each other. For example, a first element may be named a second element without departing from the scope of the present invention. Likewise, a second element may be named a first element. A term "and/or" includes a combination of a plurality of related and described items or any one of a plurality of related and described items.

When it is said that one element is "connected" or "coupled" with the other element, it should be understood that one element may be directly connected or coupled with the other element, but a third element may exist between the two elements. In contrast, when it is said that one element is "directly connected" or "directly coupled" with the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

All terms used herein, unless otherwise defined, have the same meanings as those typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Hereinafter, some exemplary embodiments of the present invention are described in more detail with reference to the accompanying drawings. In describing the present invention, in order to help general understanding, the same reference numerals are used to denote the same elements throughout the drawings, and a redundant description of the same elements is omitted.

Broadcasting Service Environment in which 3DTV is Interchangeable with HDTV

Today, in the case of terrestrial wave DTV, a single broadcasting program is transmitted through a single channel. If service-compatible 3DTV service or Multi-Mode Service (MMS) by which a plurality of programs is served through a single channel is introduced, however, time during which a single HDTV program is served and mixed broadcasting in which a plurality of programs, such as a 3DTV program or an MMS program, is served may be present in a single channel depending on a broadcasting program, as illustrated in FIGS. 4A and 4B.

A service-compatible 3DTV method is a 3DTV method for encoding and sending the streams of left and right images, and has compatibility with existing HDTV broadcasting service. A user who owns existing HDTV may receive only signals that belong to 3DTV signals and that are encoded by an MPEG-2 encoder, and may view HDTV broadcasting. Likewise, even in a multi-channel service method, a user who owns existing HDTV may view one of a plurality of programs provided by existing HDTV 1.

In contrast, if a user has 3DTV or TV or a terminal capable of MMS viewing, the user may select and view 3DTV and a desired one of a plurality of programs. In this case, a broadcasting company has to switch the program from a single HDTV program to a 3DTV program or an MMS program or from a 3DTV program or an MMS program to a single HDTV program and to send corresponding MPEG-2 TSs. In such a case, a phenomenon in which audio is disconnected video is broken should not occur because an existing HDTV user continuously views only single HDTV broadcasting although the transmitted MPEG-2 TSs are output by different encoders.

Figure 5:
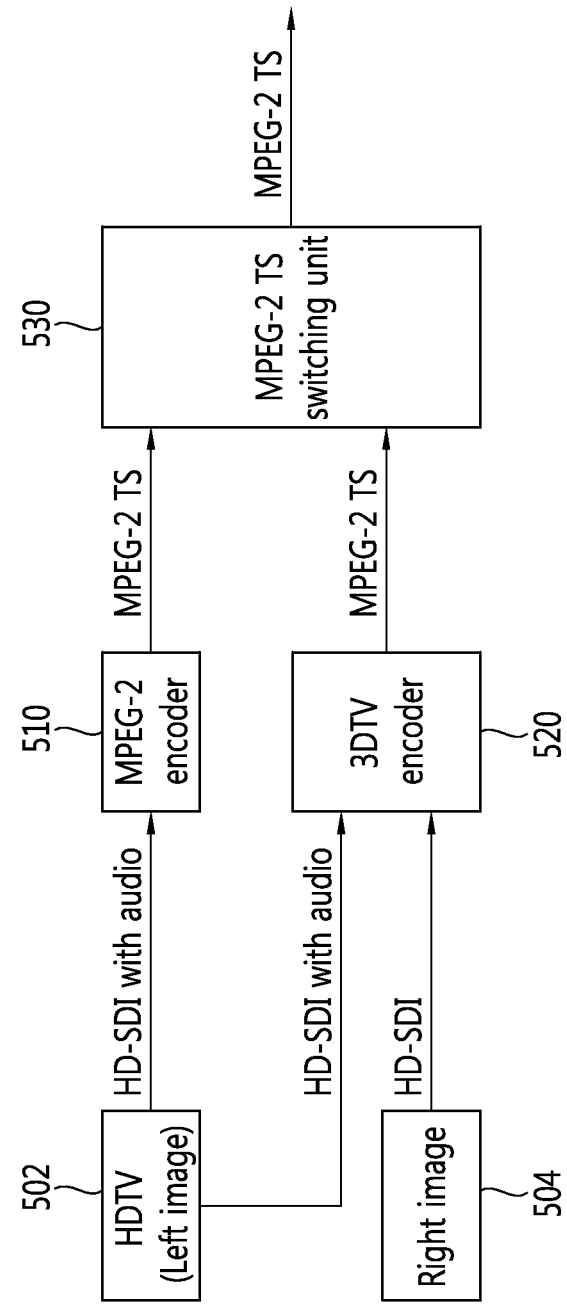
FIG. 5 is a diagram illustrating the input/output forms of an MPEG-2 TS switching unit for broadcasting service support in which 3DTV is interchangeable with HDTV in a single channel according to an embodiment of the present invention.

FIG. 5 is a diagram illustrating the input/output forms of an MPEG-2 TS switching unit for broadcasting service support in which 3DTV is interchangeable with HDTV in a single channel according to an embodiment of the present invention.

Referring to FIG. 5, regarding, an MPEG-2 encoder 510 encodes the signal 502 of a single HDTV program, and a 3DTV encoder 520 encodes the HDTV (left image) signal 502 and right-image signal 504 of a 3DTV program. In general, in a broadcasting company, the two encoders 510 and 520 continue to operate around the clock regardless of whether a program is an HDTV or 3DTV program for stability purposes. Accordingly, the HDTV encoder 510, the 3DTV encoder 520, and an MPEG-2 TS switching unit 530 continue to normally operate regardless of the type of program. If a program is an HDTV program, the 3DTV encoder 520 may encode only the left image 502, and the right image 504 may output null data. The MPEG-2 TS switching unit 530 for mixed broadcasting support basically outputs TSs received from the MPEG-2 encoder 510. When a 3DTV program is started, the MPEG-2 TS switching unit 530 switches into TSs received from the 3DTV encoder 520 and outputs the TSs. In this case, the TSs output by the 3DTV encoder 520 includes an HDTV program. When the 3DTV program is received, a viewer who owns HDTV receives, decodes, ad views only an HDTV signal in an MPEG-2 TS output by the 3DTV encoder 520. In this case, it is important that the video and audio of HDTV are not broken. Likewise, a viewer who owns 3DTV continues to receive and decode only HDTV signal. When information called the 3DTV program is received, the viewer determines whether or not to view HDTV or to change HDTV into 3DTV and view 3DTV depending on his or her preference. Accordingly, a phenomenon in which the video and audio of the HDTV (left image) 502 are broken should not occur. When a user selects 3DTV watching mode, the right image 504 is decoded. Accordingly, broadcasting is started from the beginning without a connected part. For this reason, when the MPEG-2 TS switching unit 530 switches an HDTV program TS into a 3DTV program TS, the MPEG-2 TS switching unit 530 searches the left image 502 TS within the HDTV program TS and the 3DTV program TS for an out-point and an in-point. When the in-point of the left image 502 TS is determined and switched, the right image 504 TS performs switching processing on the right image 504 TS based on the in-point of the left image 502 TS. In this specification, the TS has been illustrated as being an MPEG-2 TS, but may be another TS, for example, an MPEG Media Transport (MMT) stream. Furthermore, a switched service signal is not necessarily limited to only an HDTV and 3DTV signal, but may be applied to the switching of a specific service method having a different encoding method. If switching is necessarily required because encoding parameters are different although the same encoding method is used, a switching method according to an embodiment of the present invention may be used.

Transport Stream Switching Method

Figure 6:
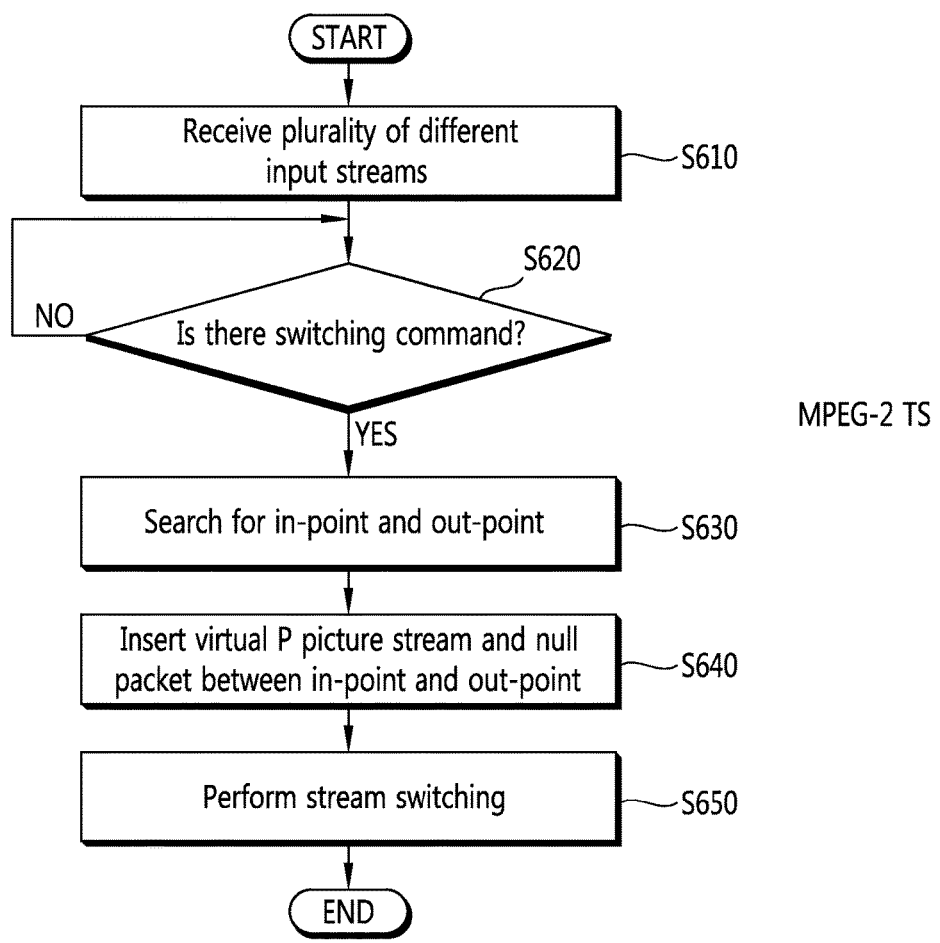
FIG. 6 is a flowchart schematically illustrating a method of switching a transport stream according to an embodiment of the present invention.

FIG. 6 is a flowchart schematically illustrating a method of switching a transport stream according to an embodiment of the present invention.

Referring to FIG. 6, first, a TS switching apparatus (not shown) receives a plurality of different input streams at step S610. The different input streams are streams that need to be switched, and may be streams having different encoding methods. The different input streams may be streams received from different encoders. When the plurality of input streams is received, the apparatus may monitor whether a switching command is present or not at step S620. The switching command may be automatically or manually received. For example, a user who wants switching may input the switching command using a user interface (not shown), or the switching command may be automatically received through user setting. When the switching command is automatically received, time may be set so that the switching command is periodically received. If, as a result of the monitoring, a switching command is found to be present, the apparatus searches for an out-point and an in-point at step S630. As described above, the out-point and the in-point may be searched for based on a point of time at which a specific picture appears in a first input stream and a second input stream (the first input stream is a stream whose output is terminated by switching, and the second input stream is a stream that is newly output by the switching). That is, the out-point may be searched for based on the first input stream, and the in-point may be searched for based on the second input stream from the location of the out-point. In accordance with an embodiment of the present invention, as in a conventional method, the out-point and in-point of the first and the second input streams that are related to the switching may be searched for by taking into consideration only the absolute relation between the first input stream and the second input stream. That is, the out-point and the in-point are pushed backward in accordance to a relative relation, thereby being capable of preventing the delay of a switching time from occurring.

After the out-point and the in-point are searched for as described above, the apparatus inserts a virtual P picture Element Stream (ES) and a null packet between the out-point and the in-point at step S640. In accordance with an embodiment of the present invention, the virtual P picture ES is a stream in which the motion information of all macro blocks is 0 and a residual signal becomes 0 according to a video encoding method, such as MPEG-2, Advanced Video Coding (AVC), or High Efficiency Video Coding (HEVC) through the analysis of a video ES included in a received TS. The virtual P picture ES may be previously generated and stored in memory. Any one of the in-point search process and the process of inserting the virtual P picture and the null packet may be first performed according to circumstances. That is, after searching for the out-point, the virtual P picture and the null packet may be inserted until the in-point appears, a picture stream suitable for in-point conditions may be searched for, and the insertion of the virtual P picture and the null packet may be then terminated. Alternatively, after searching for the out-point, the in-point may be scanned in advance, and the virtual P picture and the null packet may be then inserted between the retrieved in-point and the scanned out-point. The null packet functions to set the length of a packet by performing filling by the length of a P or B picture stream from the out-point of the first input stream to the in-point of the second input stream.

After inserting the virtual P picture ES and the null packet, the apparatus performs switching into the second input stream at the in-point at step S650.

Figure 7:
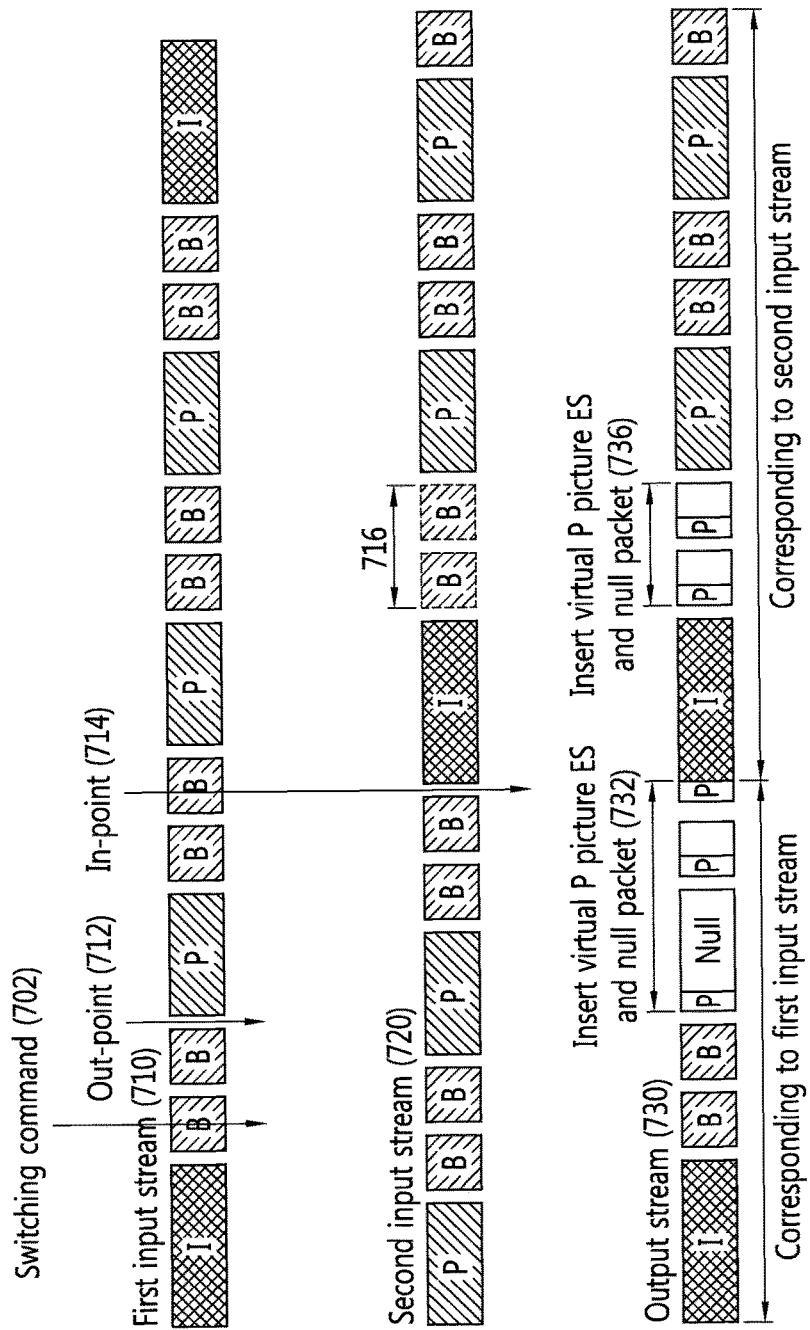
FIG. 7 is a conceptual diagram illustrating the configuration of video streams when switching is performed from a first input stream to a second input stream in the method of switching a transport stream according to an embodiment of the present invention.

FIG. 7 is a conceptual diagram illustrating the configuration of video streams when switching is performed from a first input stream to a second input stream in the method of switching a transport stream according to an embodiment of the present invention.

Referring to FIG. 7, when a TS switching apparatus (e.g., the MPEG-2 TS switching unit) is powered on, the apparatus may receive a first input stream 710 and a second input stream 720. In this case, according to an embodiment corresponding to the aforementioned example, the first input stream 710 may be an HDTV TS, and the second input stream 720 may be a 3DTV TS (refer to FIG. 5). In such a case, the HDTV TS is automatically output as the first input stream 710. In this case, a 3DTV program is started, and a user who tries to switch into the second input stream 720 (i.e., the 3DTV TS) may issue a switching command 702. As described above, the switching command 702 may be automatically or manually input. When the switching command 702 is input, the apparatus searches the video of the first input stream 710 for an out-point 712, and performs replacement and insertion on a virtual P picture ES 732 until an in-point 714 appears based on a left image video within the second input stream 720 (i.e., the 3DTV TS) from the location of the out-point 712. Furthermore, the apparatus sets the length of a packet by performing filling using a null packet by the length of a P or B picture stream from the out-point 712 to the in-point 714 in the video stream of the first input stream 710.

Referring to an output stream 730, the apparatus replaces the P or B picture part of the first input stream 710 with the virtual P picture ES 732 according to the first input stream 710 in the stream section 732. The virtual P picture ES 732 is a stream in which the motion information of all macro blocks is 0 and the residual signal has been made to become 0. Accordingly, the start location of an I picture may be easily filled with a null packet at the first in-point 714 after the out-point 712 even without buffering an input TS because the amount of data of the virtual P picture ES 732 is much smaller than an actual video picture ES.

In accordance with an embodiment of the present invention, two B pictures 716 indicated by dotted lines after the in-point 714 are replaced with a virtual P picture ES 736, thereby preventing a phenomenon in which video is broken although separate two TSs are connected. The two B pictures 716 indicated by the dotted lines are pictures that refer to a picture before the in-point of the second input stream 714, and video may be broken because the referred picture is present prior to switching and thus a picture to be referred to is not present. In this case, a phenomenon in which video is broken may be prevented by replacing the two B pictures 716 with the virtual P picture ES 736. If two videos correspond streams encoded using different encoding methods, the virtual P picture ES 732 from the out-point 712 to the in-point 714 and the virtual P picture ES 736 after the in-point 714 may have different forms of ESs from a viewpoint of the output stream 730.

In accordance with an embodiment of the present invention, the virtual P picture ES 732 from the out-point 712 to the in-point 714 and the virtual P picture ES 736 after the in-point 714 become the same virtual P picture ES because video within the first input stream 710 (i.e., the HDTV TS) uses an MPEG-2 encoder and likewise a left image video within the second input stream 720 (i.e., the 3DTV TS) uses an MPEG-2 encoder.

Figure 8:
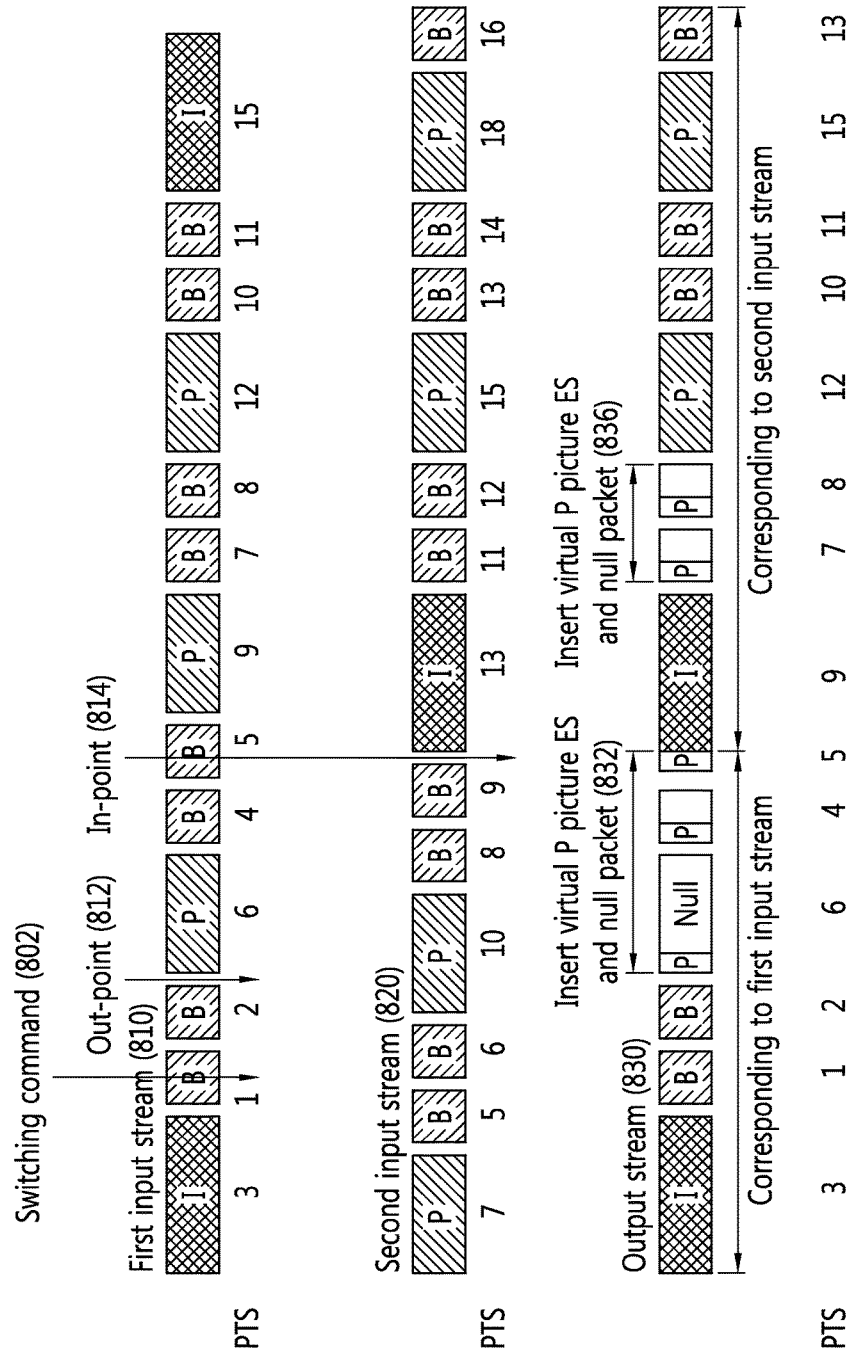
FIG. 8 is a conceptual diagram illustrating an example of a change of the PTS of a video Element Stream (ES) in a second input stream that has been switched and input in the method of switching a transport stream according to an embodiment of the present invention.

FIG. 8 is a conceptual diagram illustrating an example of a change of the PTS of a video ES in a second input stream that has been switched and input in the method of switching a transport stream according to an embodiment of the present invention.

Referring to FIG. 8, in an ES output as in FIG. 7, the Presentation Time Stamp (PTS), the Decoding Time Stamp (DTS), and the time stamp of a Program Clock Reference (PCR) of a left-image video ES within a second input stream 820 (e.g., a 3DTV TS) that has been switched need to be modified. The time stamp is modified so that it becomes the PTS, the DTS, and the time stamp of the PCR that are continuous based on the time information of an HDTV MPEG-2 TS, that is, the first input stream 810. In this case, the DTS and the PCR may be processed based on the PTS.

In accordance with another embodiment of the present invention, in switching from an HDTV TS into a 3DTV TS, the switching of a right-image video ES within the 3DTV TS is performed based on a left-image video ES. That is, an in-point may be searched for based on the left-image video ES within the 3DTV TS, and the PTS of video at which switching is started may be stored. Thereafter, when the right-image video ES within the input 3DTV MPEG-2 TS appears, a PTS and a DTS may be modified based on the stored PTS, and a PCR may be modified based on the PCR of the first input stream 810.

Procedure for Processing Re-Switching Command

Figure 9:
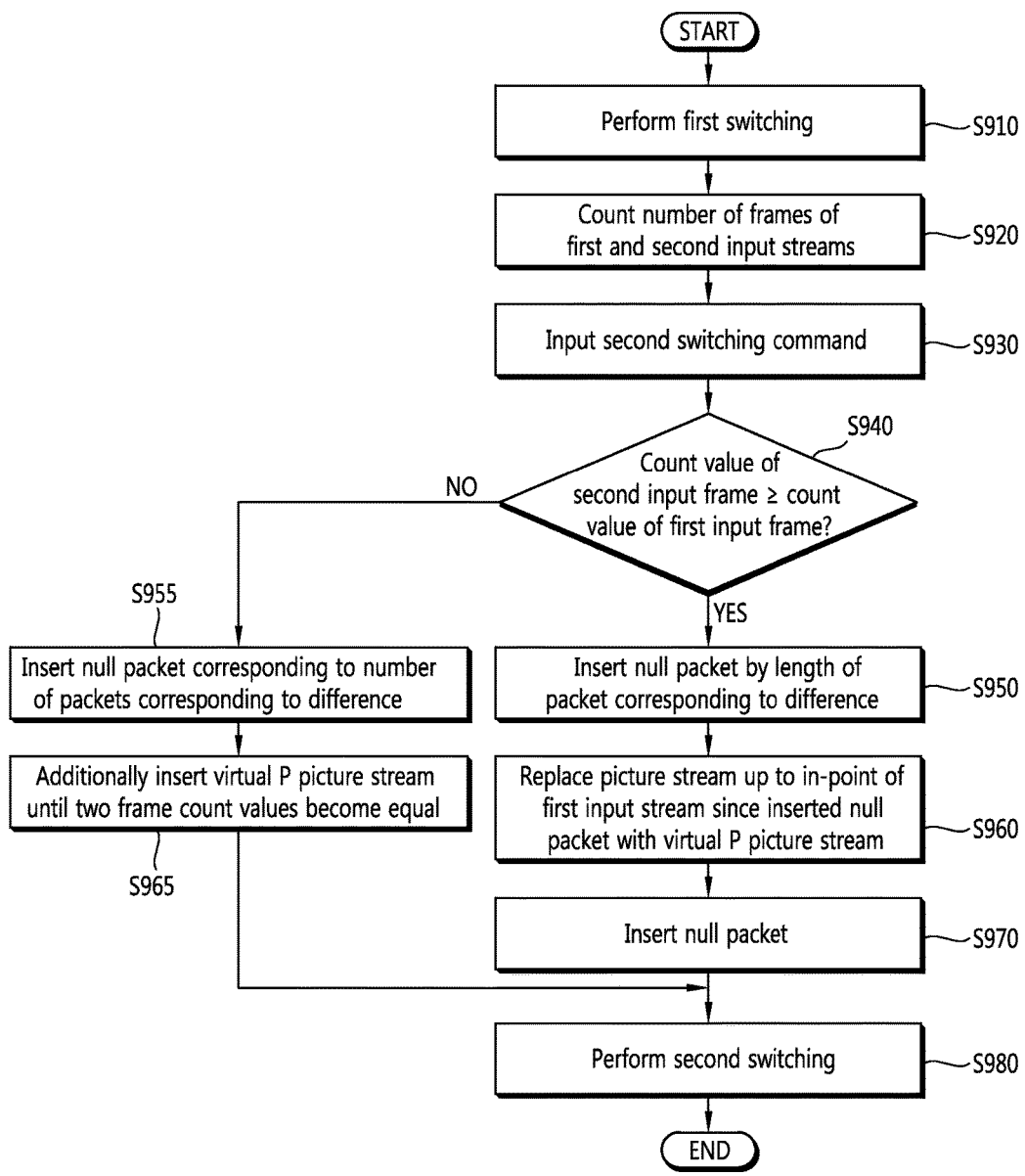
FIG. 9 is a flowchart illustrating a switching method according to the counted values of frames of first and second input streams in the method of switching a transport stream according to another embodiment of the present invention.

FIG. 9 is a flowchart illustrating a switching method according to the counted values of frames of first and second input streams in the method of switching a transport stream according to another embodiment of the present invention.

Referring to FIG. 9, after performing first switching from a first input stream to a second input stream at step S910, the TS switching apparatus (not shown) counts the number of frames of first and second input streams at step S920. The counting of the number of frames of first and second input streams does not need to be necessarily performed after the first switching, but may be performed in such a manner that the number of frames of the first and the second input frames is set based on a switching time point in the state in which a frame counter (not shown) already counts the number of frames. Thereafter, the apparatus receives a second switching command for switching the second input stream into the first input stream at step S930. For example, the second switching command may include a switching command for switching a 3DTV TS into an HDTV TS while the 3DTV TS is output in the state in which the HDTV TS has been switched into the 3DTV TS. In this case, the apparatus compares the count value of the second input frame with the count value of the first input frame until the switching command is received after the first switching at step S940. In this case, a process for second switching may be differently performed based on a result of the comparison.

If, as a result of the comparison, the count value of the second input frame is equal to or greater than the count value of the first input frame, the apparatus inserts a null packet by the length of a packet of the number of frames that corresponds to the difference between the second input frame and the first input frame at step S950. Thereafter, picture streams from the inserted null packet to the in-point of the first input stream may be replaced with a virtual P picture ES at step S960. As in the aforementioned embodiment, after the picture streams are replaced with the virtual P picture ES, a null packet is inserted in order to set the length of the packet at step S970. Thereafter, the second switching is performed at the in-point of the first input stream at step S980.

In contrast, if, as a result of the comparison at step S940, the count value of the first input frame is greater than the count value of the second input frame, a virtual P picture ES is inserted by the number of packets corresponding to the difference between the count value of the first input frame and the count value of the second input frame at step S955. Thereafter, the number of frames of the first and the second input streams continues to be counted after the first switching at the moment when the virtual P picture ES is inserted, and a virtual P picture ES is additionally inserted until the number of frames of the first input stream becomes equal to the number of frames of the second input stream at step S965. When the number of frames of the first input stream becomes equal to the number of frames of the second input stream, the process is terminated, and the second switching is performed at the in-point of the first input stream at step S980.

Figure 10:
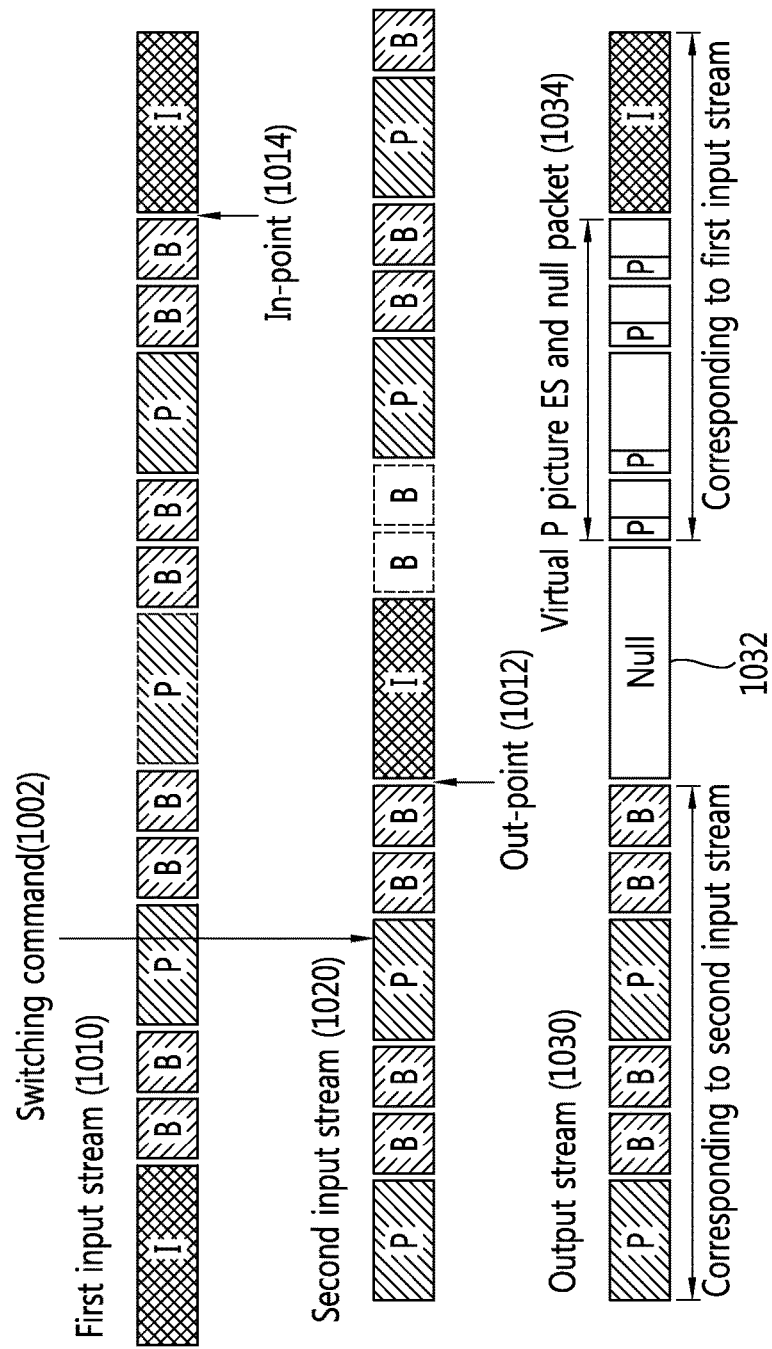
FIG. 10 is a conceptual diagram illustrating an example in which the count number of frames of a second stream is greater than the count number of frames of a first stream at an out-point in switching from the second input stream to the first input stream in the method of switching a transport stream according to another embodiment of the present invention.

FIG. 10 is a conceptual diagram illustrating an example in which the count number of frames of a second stream is greater than the count number of frames of a first stream at an out-point in switching from the second input stream to the first input stream in the method of switching a transport stream according to another embodiment of the present invention.

Referring to FIG. 10, a first input stream 1010 (e.g., an HDTV TS) is switched into a second input stream 1020 (e.g., a 3DTV TS), and the second input stream 1020 (e.g., the 3DTV TS) is output. If a 3DTV program is terminated and the second input stream 1020 (e.g., the 3DTV TS) is switched into the first input stream 1010 (e.g., the HDTV TS) again, the apparatus continues to count the number of video frames of the first input stream 1010 that is received after the first input stream 1010 is switched into the second input stream 1020 and the number of video frames (e.g., the number of left-image video frames) output by the second input stream 1020 in order to prevent a problem in video and audio signals. The number of frames of the first input stream 1010 (e.g., the HDTV TS) is called "Frame_Count_1", and the number of frames of the second input stream 1010 (e.g., the 3DTV TS) is called "Frame_Count_2". When a switching command 1002 for switching the second input stream 1020 into the first input stream 1010 is received, the apparatus searches for an out-point 1012 and an in-point 1014 as described above. A TS switching processing method is divided into two types depending on which one of Frame_Count_1 and Frame_Count_2 at the out-point 1012 is great.

First, if Frame_Count_2 is greater than Frame_Count_1 at the out-point 1012, a null packet 1032 is filled by the length of a packet corresponding to the number of frames obtained by subtracting Frame_Count_2 from Frame_Count_1. The embodiment of FIG. 10 illustrates that Frame_Count_1–Frame_Count_2 is 2 at the out-point 1012. The null packet 1032 is filled by the length of a packet corresponding to a P picture and a B picture indicated by dotted line in the video ES within the first input stream 1010 (e.g., the HDTV TS). Four picture ESs 1034 up to the in-point 1014 after the B picture indicated by the dotted line are portions corresponding to the first input stream 1010, and are replaced with virtual P pictures ES. As described above, the length of the packet is set using the null packet.

Figure 11:
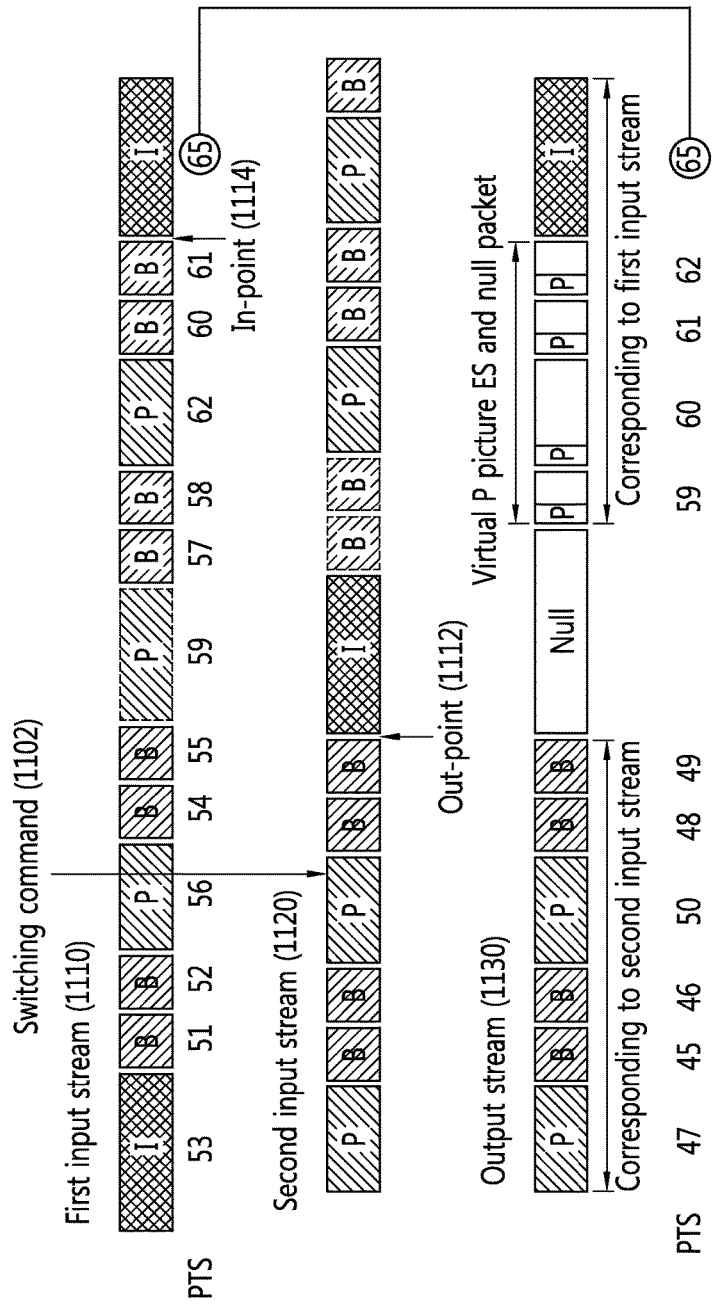
FIG. 11 is a conceptual diagram illustrating an example in which PTS values are generated when the count number of frames of a second stream is greater than the count number of frames of a first stream at an out-point in switching from the second input stream to the first input stream in the method of switching a transport stream according to another embodiment of the present invention.

FIG. 11 is a conceptual diagram illustrating an example in which PTS values are generated when the count number of frames of a second stream is greater than the count number of frames of a first stream at an out-point in switching from the second input stream to the first input stream in the method of switching a transport stream according to another embodiment of the present invention.

Referring to FIG. 11, likewise, the values of a PTS, a DTS, and the time stamp of a PCR need to be changed. If a second input stream 1120 (e.g., a 3DTV TS) is switched into a first input stream 1110 (e.g., an HDTV TS), the values of the time stamps of virtual P picture ESs have only to be generated and set as shown in FIG. 11. An in-point 1114 in the first input stream 1110 (e.g., the HDTV TS) that is switched again and input has only to be connected using an I picture without a change of time stamps (i.e., connection using a time stamp "65" in FIG. 11).

Figure 12:
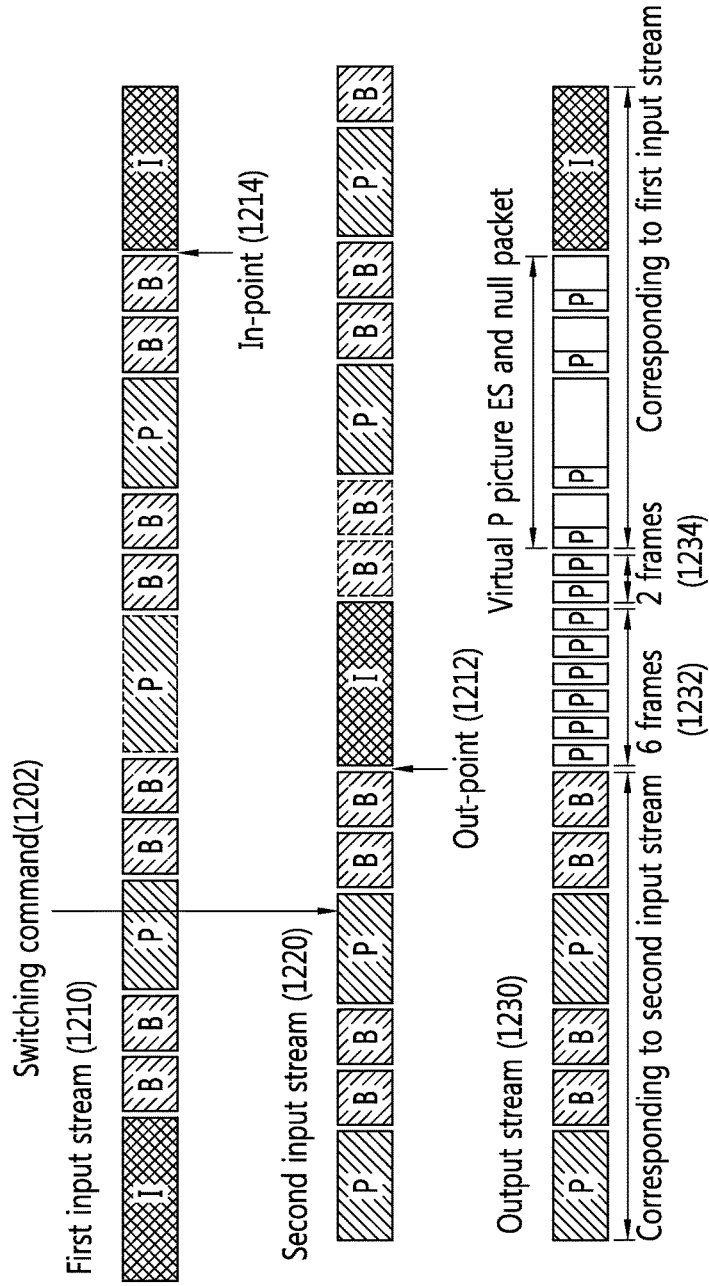
FIG. 12 is a conceptual diagram illustrating an example in which the count number of frames of a first stream is greater than the count number of frames of a second stream at an out-point in switching from the second input stream to the first input stream in the method of switching a transport stream according to yet another embodiment of the present invention.

FIG. 12 is a conceptual diagram illustrating an example in which the count number of frames of a first stream is greater than the count number of frames of a second stream at an out-point in switching from the second input stream to the first input stream in the method of switching a transport stream according to yet another embodiment of the present invention.

FIG. 12 illustrates the case where Frame_Count_2 at the out-point 1212 of a second input stream 1220 is smaller than Frame_Count_1. In such a case, virtual P picture ESs 1232 corresponding to the number of frames obtained by subtracting Frame_Count_2 from Frame_Count_1 are inserted. The video frames of a first input stream 1210 (e.g., an HDTV TS) continue to be received while the virtual P picture ESs 1232 are inserted and output. Accordingly, the number of video frames of the first input stream 1210 (e.g., the HDTV TS) continues to be counted, and the virtual P picture ESs 1232 are inserted until Frame_Count_2 becomes equal to Frame_Count_1 by continuously increasing Frame_Count_2 to the extent that the virtual P picture ESs 1232 are inserted. The embodiment of FIG. 12 illustrates the case where Frame_Count_1−Frame_Count_2=6 frames at the out-point 1212. The embodiment of FIG. 12 illustrates the case where when a total of 8 virtual P picture ESs are inserted by additionally inserting 2 virtual P picture ESs 1234, the location of a packet at which a specific frame of the first input stream 1210 (e.g., the HDTV TS) is started. Furthermore, as in the aforementioned embodiment, with respect to three pictures ahead of the in-point 1214, the length of the packet is set using virtual P picture ESs and a null packet.

Figure 13:
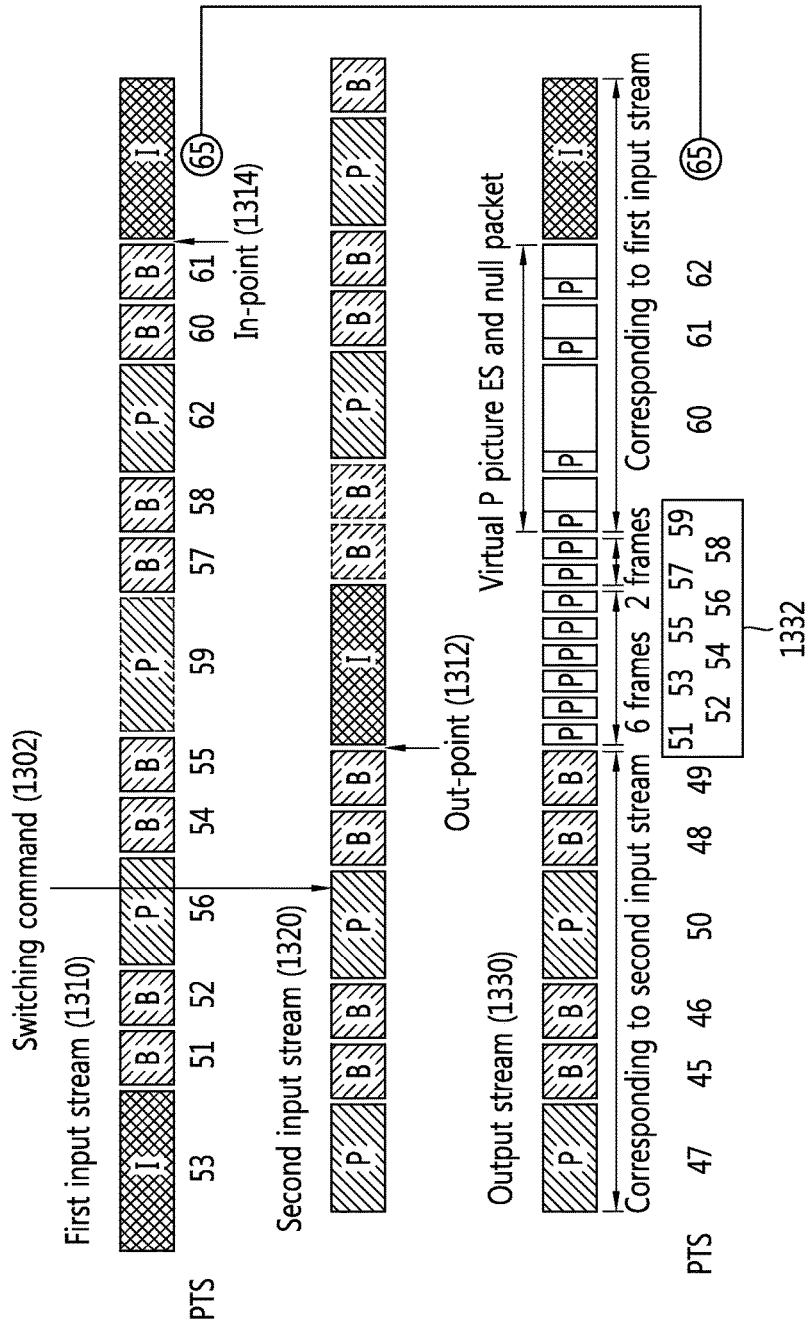
FIG. 13 is a conceptual diagram illustrating an example in which PTS values are generated when the count number of frames of a first stream is greater than the count number of frames of a second stream at an out-point in switching from the second input stream to the first input stream in the method of switching a transport stream according to yet another embodiment of the present invention.

FIG. 13 is a conceptual diagram illustrating an example in which PTS values are generated when the count number of frames of a first stream is greater than the count number of frames of a second stream at an out-point in switching from the second input stream to the first input stream in the method of switching a transport stream according to yet another embodiment of the present invention.

Referring to FIG. 13, likewise, the values of a PTS, a DTS, and the time stamp of a PCR need to be changed. If a second input stream 1320 (e.g., a 3DTV TS) is switched into a first input stream 1310 (e.g., an HDTV TS), only the values of the time stamps of an inserted virtual P picture ES 1332 have only to be newly generated and set as shown in FIG. 13. An in-point 1314 in the first input stream 1310 (e.g., the HDTV TS) that is switched again and input has only to be connected using an I picture without a change of time stamps (connected using a time stamp '65' in FIG. 13).

Processing of Audio Frame

In general, since a synchronization signal is searched for based on an audio signal, the audio signal is transmitter posterior to a video signal. Accordingly, the PTS of a picture at which video is switched is stored, and a point of time at which the PTS of audio that is later received corresponds to a PTS at which video picture is switched is used as a switching time point.

Figure 14:
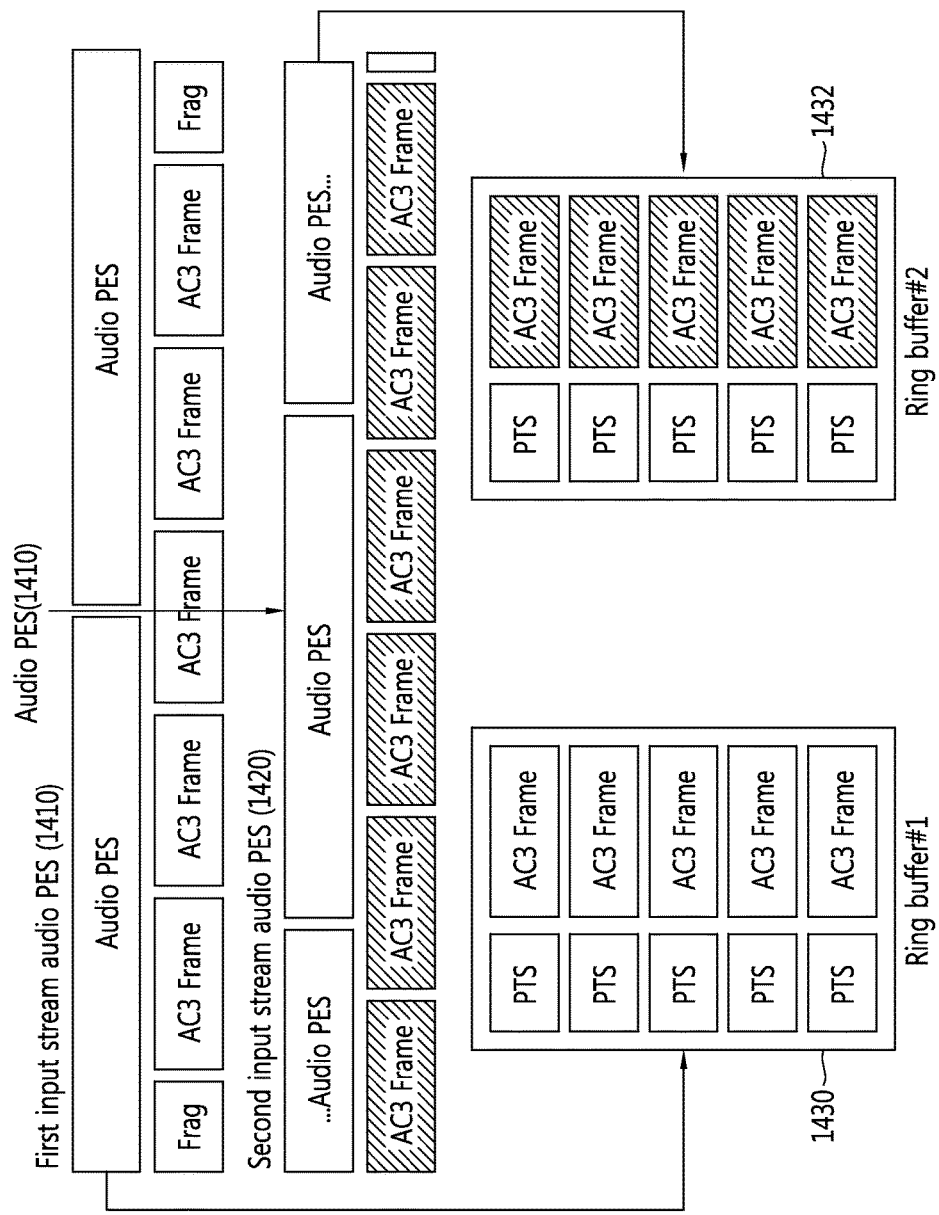
FIG. 14 is a conceptual diagram illustrating an example in which the time information of an audio frame is calculated and stored in a ring buffer in the method of switching a transport stream according to an embodiment of the present invention.

FIG. 14 is a conceptual diagram illustrating an example in which the time information of an audio frame is calculated and stored in a ring buffer in the method of switching a transport stream according to an embodiment of the present invention.

Referring to FIG. 14, a video stream is switched according to each PES because the ES of a single frame includes a single PES. In contrast, in the case of an audio stream, since the ES of a plurality of frames is included in a single PES, there is a problem in that an AC-3 decoder may not properly decode an audio signal and all streams may be seriously affected if the audio stream is switched according to each PES. The reason for this is that most of decoders perform processing based on the audio signal. Accordingly, switching processing needs to be performed on audio according to each ES included in a PES. However, time information is present according to each PES. Accordingly, in an embodiment of the present invention, as shown in FIG. 14, different ring buffers 1430 and 1432 may be configured with respect to two input streams, that is, first and second input stream audio PESs 1410 and 1420, time information about each frame included in an audio PES may be calculated based on time information included in the audio PES, and the calculated time information may be stored. That is, an AC3 frame, that is, each of ESs within the audio PES 1410 of the first input stream, may be stored in the ring buffer #1 1430 along with the time information of a PTS. An AC3 frame, that is, each of ESs within the audio PES 1420 of the second input stream, may be separately stored in the ring buffer #2 1432 along with the time information of the PTS. Accordingly, although switching is performed in the middle of the audio PES of an input stream, an ES corresponding to a switching time point may be searched for, and support may be provided so that switching is performed in a corresponding AC3 frame.

Figure 15:
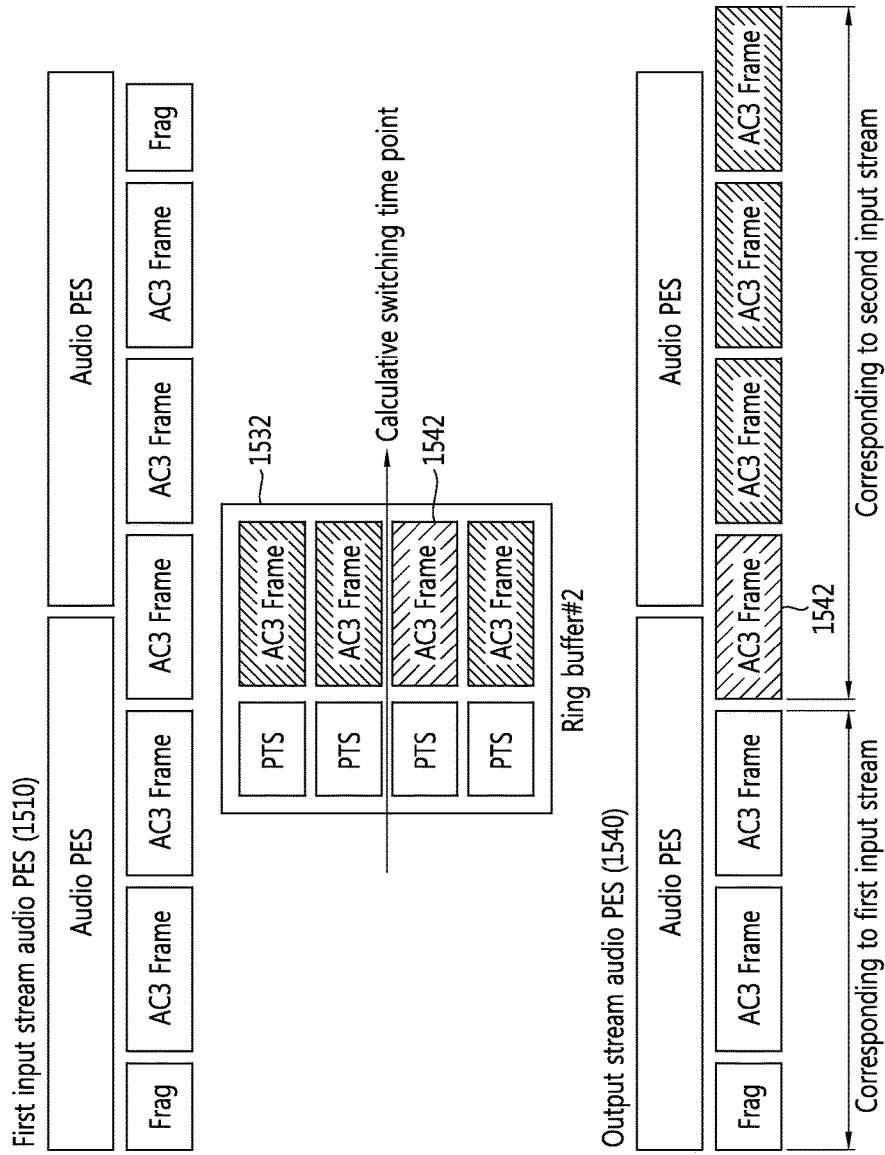
FIG. 15 is a conceptual diagram illustrating an example of the switching of an audio stream in the method of switching a transport stream according to an embodiment of the present invention.

FIG. 15 is a conceptual diagram illustrating an example of the switching of an audio stream in the method of switching a transport stream according to an embodiment of the present invention.

Referring to FIG. 15, in switching from a first input stream audio PES 1510 to a second input stream audio PES, a calculative switching time point is calculated based on the PTS of a corresponding PES using a ring buffer #2 1532 in which the time information of each ES of the second input stream audio PES and the ES data of the second input stream audio PES are stored. Thereafter, control is performed so that switching into the second input stream audio PES is performed in the AC3 frame 1542 of the second input stream audio PES corresponding to the calculated switching time point.

Other Utilization

The method of switching a transport stream according to an embodiment of the present invention may be applied to mutual switching between two different HDTV TSs and mutual switching between TSs for multi-channel service in an HDTV TS in addition to switching from an HDTV TS to a 3DTV TS.

Furthermore, the MPEG-2 TS switching unit according to an embodiment of the present invention has a function of generating Program Specific Information (PSI) suitable for service depending on whether switching between what MPEG-2 TSs will be performed.

TS Switching Apparatus

Figure 16:
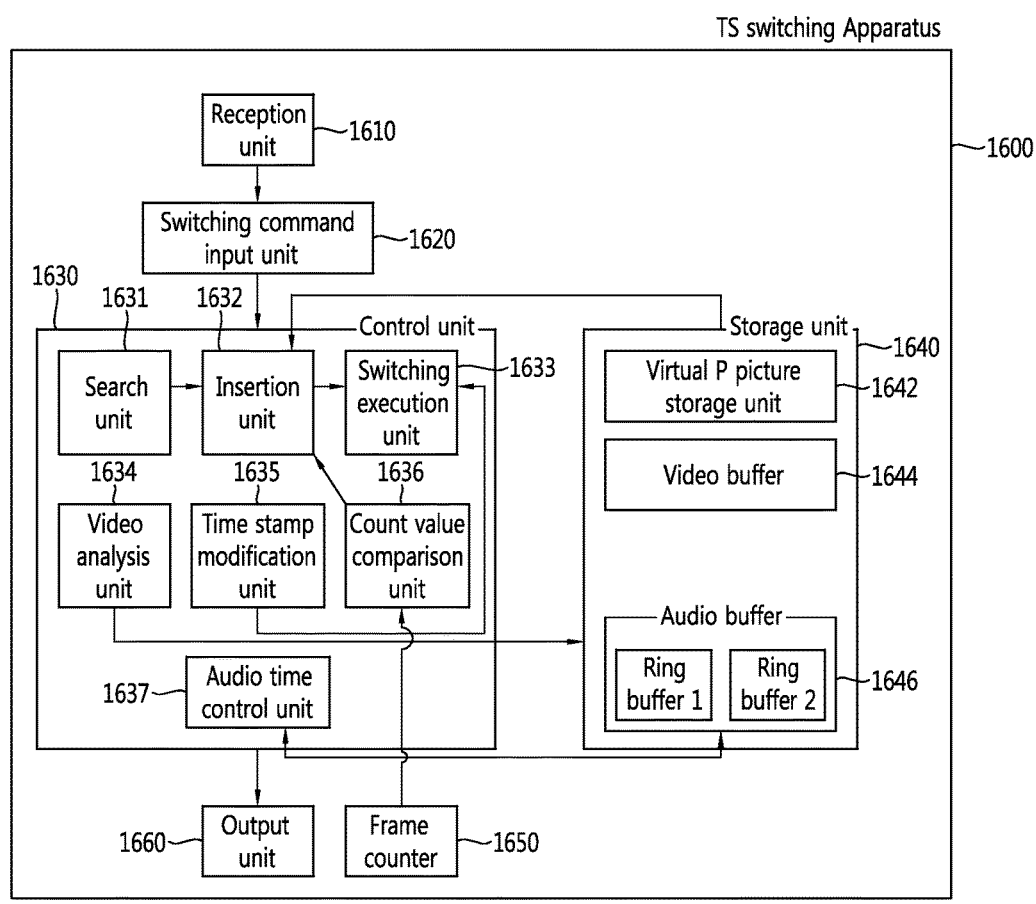
FIG. 16 is a block diagram illustrating a TS switching apparatus according to an embodiment of the present invention.

FIG. 16 is a block diagram illustrating a TS switching apparatus according to an embodiment of the present invention. As shown in FIG. 16, the TS switching apparatus 1600 according to an embodiment of the present invention may include a reception unit 1610, a switching command input unit 1620, a control unit 1630, a storage unit 1640, a frame counter 1650, and an output unit 1660.

Referring to FIG. 16, the reception unit 1610 receives a plurality of different input streams. The received input streams may be streams received from different encoders. Methods of encoding the received input streams may be the same or may be different. The reception unit 1610 receives the input streams through wired or wireless communication.

The switching command input unit 1620 manually or automatically inputs a switching command. If the switching command is manually input, the switching command may be input through a user interface (not shown) from a user who wants to input the switching command. If the switching command is automatically input, the switching command may be input depending on set input conditions. The input conditions may be set based on time. In this case, the switching command may be periodically input in a specific time period, or a scheduling time may be set and the switching command for automatically switching a channel 1 into a channel 2 may be input at a specific point of time. In addition to time, channel conditions, network conditions, etc. may be set, and the switching command may be automatically input depending on network conditions (e.g., an available bandwidth and a packet loss ratio).

The control unit 1630 controls the execution of switching between received input streams in response to the input of a switching command. The control unit 1630 may include a search unit 1631, an insertion unit 1632, a switching execution unit 1633, a video analysis unit 1634, a time stamp modification unit 1635, a count value comparison unit 1636, and an audio time control unit 1637.

When a switching command is received, the search unit 1631 searches for the out-point of a first input stream whose output is terminated by switching and the in-point of a second input stream that is newly output by the switching. The out-point may be searched for as the start point of the first I or P picture after the switching command is received, and the in-point may be searched for as the start point of the first I picture after the out-point.

The insertion unit 1632 inserts a virtual P picture ES and a null packet between the out-point and the in-point. The insertion unit 1632 may receive the virtual P picture ES from a virtual P picture storage unit 1642, and may insert the received virtual P picture ES between the out-point and the in-point. The insertion unit 1632 may replace a picture that belongs to a P or B picture after the in-point and that refers to video before the in-point, and may insert the virtual P picture ES. In this case, in the case of the P or B picture, a virtual P picture based on the encoding method of a second input stream is received from the virtual P picture storage unit 1642, and is inserted.

The switching execution unit 1633 performs switching between input streams at an in-point.

The video analysis unit 1634 may analyze the video ES of an input stream received from the reception unit 1610, may generate a virtual P picture ES, and may store the generated virtual P picture ES in the virtual P picture storage unit 1642. If methods of encoding first and second input streams are different, the video analysis unit 1634 may generate and store different virtual P picture ESs.

The time stamp modification unit 1635 receives information about the PTS, DTS, and PCR of each input stream from a time stamp (not shown), and modifies the information about the PTS, the DTS, and the PCR suitably for switching between input streams. For example, the time stamp modification unit 1635 may modify information about the PTS, DTS, and PCR of a second input stream so that the PTS, the DTS, and the PCR become a PTS, a DTS and the time stamp of a PCR that are continuous based on the time information of a first input stream.

When second switching (re-switching) from a second input stream to a first input stream is performed again after first switching from the first input stream into the second input stream, the count value comparison unit 1636 receives the value of the number of frames of the first input stream and the value of the number of frames of the second input stream, counted based on a first switching time point, from the frame counter 1650, and compares the count value of the number of frames of the first input stream with the counted value of the number of frames of the second input stream. A method of inserting, by the insertion unit 1632, a virtual P picture ES and a null packet may differ based on a result of the comparison of the count value comparison unit 1636. For example, if the frame count value of the second input stream is equal to or greater than the frame count value of the first input stream, a null packet may be inserted by the length of a packet that corresponds to the number of frames corresponding to the difference between the two frame count values, picture streams up to the in-point of the first input stream may be replaced with virtual P picture ESs, and the length of a packet may be set using a null packet. In contrast, if the frame count value of the first input stream is greater than the frame count value of the second input stream, virtual P picture ESs may be continuously inserted by the number of packets corresponding to the difference between the two frame count values, the number of frames of the two input streams may continue to be counted while the virtual P picture ESs are inserted, and virtual P picture ESs may be further inserted until the two frame count values become equal.

The audio time control unit 1637 separately stores the ESs and pieces of time information of the audio PESs of different input streams that are stored in different ring buffers (e.g., a ring buffer 1 and a ring buffer 2) within the audio buffer 1646 of the storage unit 1640. The audio time control unit 1637 stores the PTS of a picture at which video is switched, compares the stored PTS of the picture with the PTS of audio that is later received, and determines a point of time, corresponding to the stored PTS, to be a switching time point. Thereafter, the audio time control unit 1637 performs control so that switching is performed in the ES (e.g., an AC3 frame) of a second input stream corresponding to the determined switching time point.

The storage unit 1640 may include the virtual P picture storage unit 1642 configured to store at least one virtual P picture ES generated by the video analysis unit 1634, a video buffer 1644 configured to temporarily store video streams, and the audio buffer 1646.

The frame counter 1650 counts the number of frames of a received input frame.

The output unit 1660 outputs streams on which switching has been performed. The output unit 1660 may display an image of an input stream on which switching has been performed after the image is decoded by a decoder (not shown). Alternatively, the output unit 1660 may send image data to another output device according to circumstances.

In accordance with the method, apparatus, and system for switching a transport stream according to embodiments of the present invention, there is an advantage in that audio and video can be restored without a phenomenon in which the audio is disconnected or the video is broken at a point of time at which two different MPEG-2 TSs output by different encoders in an open GOP structure are connected when connecting the two MPEG-2 TSs. Furthermore, there is an advantage in that switching can be performed within a short time as much as possible from a point of time at which a switching command is received from a user without buffering two input TSs. Accordingly, the present invention is a technology that is necessarily required for broadcasting service in which HDTV and 3DTV or multi-channel service are interchangeably used in a single channel.

Furthermore, in accordance with the method, apparatus, and system for switching a transport stream according to embodiments of the present invention, since the processing time taken for input to and output from the MPEG-2 TS switching unit is minimized, the delay of a broadcasting program is reduced, and thus an input TS can be immediately processed without storing the TS in a buffer.

The present invention has been described with reference to the accompanying drawings and some embodiments, but the scope of the present invention should not be construed as being limited to the drawings or the embodiments. It is to be understood that those skilled in the art may modify and change the present invention in various ways without departing from the spirit and scope of the present invention written in the claims.

What is claimed is:

1. A method of switching a transport stream, comprising:
receiving input streams;
receiving a switching command for a first input stream that belongs to the input streams and that is currently output;
searching for an out-point of the first input stream and an in-point of a second input stream that is newly output, based on the switching command;
inserting a virtual P picture stream and zero or more null packets between the out-point and the in-point by replacing a picture stream of the first input stream from the out-point to the in-point with virtual P pictures, each virtual P picture being followed by zero or one null packets; and
performing switching from the first input stream into the second input stream based on the out-point and the in-point,
wherein an element stream from the out-point to the in-point is entirely filled with the virtual P picture stream and the zero or more null packets, and
wherein if a P or B picture of the second input stream after the in-point that refers to a picture before the in-point is present, the P or B picture is replaced with the virtual P picture stream and a null packet corresponding to a length of a packet comprising the P or B picture is inserted.

2. The method of claim 1, wherein:
the out-point is searched for as a start point of a first I or P picture of the first input stream after the switching command, and
the in-point is searched for as a start point of a first I picture of the second input stream after the out-point.

3. The method of claim 1, wherein the virtual P picture stream comprises a stream in which motion information of all the macro blocks and a residual signal are made 0 according to an encoding method through an analysis of a video Element Stream (ES) included in the first or the second input stream.

4. The method of claim 1, wherein a Presentation Time Stamp (PTS), a Decoding Time Stamp (DTS), and a time stamp of a Program Clock Reference (PCR) of the second input stream after the in-point are modified so that the PTS, the DTS, and the time stamp become a PTS, a DTS, and a time stamp of a PCR that are continuous based on time information of the first input stream.

5. The method of claim 4, wherein if the second input stream is a stream of a three-dimensional (3D) left image, in switching from the second input stream to a right-image video stream corresponding to the 3D left image, when the switching is performed based on the in-point of the second input stream, a PTS of a picture corresponding to the in-point of the second input stream is stored, a PTS and DTS of the right-image video stream are modified based on the stored PTS, and a PCR of the right-image video stream is modified based on a PCR of the first input stream.

6. The method of claim 1, further comprising:
when second switching from the second input stream to the first input stream is performed after first switching from the first input stream to the second input stream, counting a first frame count value that is a number of frames of the first input stream and a second frame count value that is a number of frames of the second input stream until a switching command for the second switching is input after the first switching; and
comparing the first frame count value with the second frame count value and performing the second switching based on a result of the comparison.

7. The method of claim 6, wherein if, as a result of the comparison, the second frame count value is equal to or greater than the first frame count value, the null packet is inserted between the out-point of the second input stream and the in-point of the first input stream by a length of a packet corresponding to a number of frames obtained by subtracting the second frame count value from the first frame count value when performing the second switching.

8. The method of claim 7, wherein:
a picture stream up to the in-point of the first input stream after the inserted null packet is replaced with the virtual P picture stream, and
the length of the packet is set using the null packet.

9. The method of claim 6, wherein if, as a result of the comparison, the first frame count value is greater than the second frame count value, the virtual P picture stream is inserted between the out-point of the second input stream and the in-point of the first input stream by a number of packets corresponding to a number of frames obtained by subtracting the first frame count value from the second frame count value when performing the second switching, the first frame count and the second frame count continue to be performed while inserting and outputting the virtual P picture stream, and a virtual P picture stream is additionally inserted until the first frame count becomes equal to the second frame count.

10. The method of claim 1, wherein switching of an audio signal from the first input stream to the second input stream is performed by storing a Presentation Time Stamp (PTS) of a picture at which video is switched and using a point of time at which a PTS of subsequently input audio corresponds to a PTS at which a picture of the video is switched as a switching time point.

11. The method of claim 10, wherein:
different ring buffers for the first input stream and the second input stream are configured, and
time information about each frame included in an audio Packetized Elementary Stream (PES) is calculated based on time information included in the PES, and the calculated time information is stored.

12. The method of claim 1, wherein each null packet has a length for filling a packet corresponding to a length of a P or B picture of the first input stream from the out-point of the first input stream to the in-point of the second input stream.

13. An apparatus for switching a transport stream, comprising:
an input stream receiver configured to receive input streams;
a switching command receiver configured to receive a switching command for a first input stream that belongs to the input streams and that is currently output;
a searcher configured to search for an out-point of the first input stream and an in-point of a second input stream that is newly output, based on the switching command;
an inserter configured to insert a virtual P picture stream and zero or more null packets between the out-point and the in-point by replacing a picture stream of the first input stream from the out-point to the in-point with virtual P pictures, each virtual P picture being followed by zero or one null packets; and
a switch configured to perform switching from the first input stream into the second input stream based on the out-point and the in-point, wherein an element stream from the out-point to the in-point is entirely filled with the virtual P picture stream and the zero or more null packets, and wherein if a P or B picture of the second input stream after the in-point that refers to a picture before the in-point is present, the P or B picture is replaced with the virtual P picture stream and a null packet corresponding to a length of a packet comprising the P or B picture is inserted.

14. The apparatus of claim 13, wherein the virtual P picture stream comprises a stream in which motion information of all the macro blocks and a residual signal are made 0 according to an encoding method through an analysis of a video Element Stream (ES) included in the first or the second input stream.

15. The apparatus of claim 13, further comprising a frame counter configured to count a first frame count value that is a number of frames of the first input stream and a second frame count value that is a number of frames of the second input stream until a switching command for second switching is input after first switching when the second switching from the second input stream to the first input stream is performed after the first switching from the first input stream to the second input stream, compare the first frame count value with the second frame count value, and perform the second switching based on a result of the comparison.

16. The apparatus of claim 15, wherein if, as a result of the comparison, the second frame count value is equal to or greater than the first frame count value, the null packet is inserted between the out-point of the second input stream and the in-point of the first input stream by a length of a packet corresponding to a number of frames obtained by subtracting the second frame count value from the first frame count value when performing the second switching.

17. The apparatus of claim 15, wherein if, as a result of the comparison, the first frame count value is greater than the second frame count value, the virtual P picture stream is inserted between the out-point of the second input stream and the in-point of the first input stream by a number of packets corresponding to a number of frames obtained by subtracting the first frame count value from the second frame count value when performing the second switching, the first frame count and the second frame count continue to be performed while inserting and outputting the virtual P picture stream, and a virtual P picture stream is additionally inserted until the first frame count becomes equal to the second frame count.

18. A system for switching a transport stream, comprising:
encoders configured to generate encoded input streams and send the encoded input streams; and
a transport stream switch configured to receive encoded input streams from the encoders and perform switching into a specific input stream,
wherein the transport stream switch receives a switching command for a first input stream that belongs to the encoded input streams and that is currently output, searches for an out-point of the first input stream and an in-point of a second input stream that is newly output, in response to the switching command, inserts a virtual P picture stream and zero or more null packets between the out-point of the first input stream to the in-point of the second input stream by replacing a picture stream of the first input stream from the out-point to the in-point with virtual P pictures, each virtual P picture being followed by zero or one null packets, and performs switching from the first input stream into the second input stream based on the out-point and the in-point,
wherein an element stream from the out-point to the in-point is entirely filled with the virtual P picture stream and zero or more null packets, and
wherein if a P or B picture of the second input stream after the in-point that refers to a picture before the in-point is present, the P or B picture is replaced with the virtual P picture stream and a null packet corresponding to a length of a packet comprising the P or B picture is inserted.

* * * * *